United States Patent
Krech, Jr. et al.

(10) Patent No.: US 6,184,902 B1
(45) Date of Patent: *Feb. 6, 2001

(54) CENTRALIZED BRANCH INTELLIGENCE SYSTEM AND METHOD FOR A GEOMETRY ACCELERATOR

(75) Inventors: Alan S. Krech, Jr.; Theodore G. Rossin; Glenn W Strunk; Michael S McGrath; Edmundo Rojas; S Paul Tucker; Jon L Ashburn; Ted Rakel, all of Fort Collins, CO (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/845,975

(22) Filed: Apr. 30, 1997

(51) Int. Cl.[7] .................................................... G06F 15/16

(52) U.S. Cl. ............................ 345/503; 345/522; 712/243

(58) Field of Search ......................... 345/418, 419–427, 345/501–506, 521, 522; 395/561, 567, 571, 580, 581, 590, 595, 596; 712/211, 220, 226, 230, 233, 234, 243, 245, 246

(56) References Cited

U.S. PATENT DOCUMENTS

| 3,325,785 | 6/1967 | Stevens ................................. 712/245 |
| 3,979,725 | 9/1976 | Disparte et al. ...................... 712/236 |
| 4,312,034 | 1/1982 | Gunter et al. ......................... 712/245 |

(List continued on next page.)

FOREIGN PATENT DOCUMENTS

| 1262641 | 3/1968 | (DE) . | |
| 2336676 | 1/1975 | (DE) . | |
| 0627682A1 | 6/1993 | (EP) | ................................ G06F/9/38 |
| 1433076 | 4/1976 | (GB) | ................................ G06F/9/16 |

OTHER PUBLICATIONS

"Pyramid 3D", geometry processor, manufactured by TriTech Microelectronics International. See Internet Web page at URL: http//www.bergsoe.dtu.dk/pbk2707/gfxcard/pyramid3d/architec.htm espec. reference to geometry process calculations being based on microcode.

Mikroprozessoren und ihre Anwendungen 2; Prof. Dr.–Ing. .Wolfgan Hilberg, et al., R. Oldenbourg Verlag Muchen Wien 1979 (Translation to be provided to PTO shortly).

*Primary Examiner*—Ulka J. Chauhan

(57) ABSTRACT

The invention provides for a system and method for minimizing space requirements and increasing speed in a geometry accelerator for a computer graphics system by providing a branch central intelligence mechanism. Architecturally, the geometry accelerator includes a plurality of processing elements (e.g., an arithmetic logic unit, a multiplier, a divider, a compare mechanism, a clamp mechanism, etc.) and a plurality of control units (e.g., a transform mechanism, a decomposition mechanism, a clip mechanism, a bow-tie mechanism, a light mechanism, a classify mechanism, a plane equation mechanism, a fog mechanism, etc.) that utilize the processing elements for performing data manipulations upon image data. In accordance with the invention, the control units are implemented in a read-only memory (ROM) via microcode. A next address field is associated with each of the microcode instructions and defines a location in the ROM of a next instruction to be executed. A plurality of control unit logic elements correspond respectively with the control units and control instruction branching within their respective control unit by defining the next address field. Finally, a branch central intelligence mechanism controls branching between the control units by defining the next address field.

18 Claims, 11 Drawing Sheets

U.S. PATENT DOCUMENTS

| | | | |
|---|---|---|---|
| 4,862,392 | 8/1989 | Steiner | 345/427 |
| 4,933,847 | 6/1990 | Chau et al. | 712/236 |
| 4,949,300 | 8/1990 | Christenson et al. | 707/500 |
| 4,967,375 * | 10/1990 | Pelham et al. | 345/515 |
| 5,088,053 * | 2/1992 | Sprague et al. | 345/521 |
| 5,097,411 | 3/1992 | Doyle et al. | 345/522 |
| 5,307,464 * | 4/1994 | Akao et al. | 345/352 |
| 5,345,570 * | 9/1994 | Azekawa | 395/598 |
| 5,428,754 | 6/1995 | Baldwin | 712/220 |
| 5,481,669 * | 1/1996 | Poulton et al. | 345/505 |
| 5,517,611 * | 5/1996 | Deering | 345/503 |
| 5,574,927 | 11/1996 | Scantlin | 712/41 |
| 5,649,173 | 7/1997 | Lentz | 345/501 |
| 5,696,944 | 12/1997 | Krech, Jr. | 345/509 |
| 5,706,478 * | 1/1998 | Dye | 345/503 |
| 5,710,879 * | 1/1998 | Ashburn | 345/441 |
| 5,719,880 * | 2/1998 | Leung | 365/230.02 |
| 5,720,019 * | 2/1998 | Koss et al. | 345/434 |
| 5,815,164 * | 9/1998 | Howell | 345/501 |
| 5,889,997 * | 3/1999 | Strunk | 717/6 |

* cited by examiner

ROM 100

| INSTR SLOT | OPERATION | 2-WAY_4-WAY [BRANCH FIELD] | COND_NONCOND | NEXT_ADDR | NEXT_VERTEX (FLAG) | INITIALIZE (FLAG) | DATA PATH CONTROL (INSTR) | CONDITION_CODE |
|---|---|---|---|---|---|---|---|---|
| 0 | INITIALIZE | X | 0 | 1 | 0 | 1 | X | 0 |
| 1 | LAST TIME | 0 | 1 | 2, 3 | 0 | 0 | X | 7 |
| 2 | EXEC INSTR | X | 0 | 4 | 0 | 0 | ADD A + B | 0 |
| 3 | DONE | 1 | 1 | 8-11 | 0 | 0 | X | 5 |
| 4 | EXEC INSTR | X | 0 | 5 | 0 | 0 | ADD C + D | 0 |
| 5 | EXEC INSTR | X | 0 | 6 | 0 | 0 | MPY E * F | 0 |
| 6 | ADVANCE | X | 0 | 1 | 1 | 0 | CMP (A+B),(C+D) | 0 |
| 7 | NOTHING | X | X | X | X | X | X | X |
| 8 | CLIP | X | 0 | 12 | 0 | 1 | CODE | 0 |
| 9 | LIGHT | X | 0 | 30 | 0 | 1 | CODE | 0 |
| 10 | PLANE | X | 0 | 40 | 0 | 1 | CODE | 0 |
| 11 | DECOMP | X | 0 | 50 | 0 | 1 | CODE | 0 |

X = DON'T CARE

FIG. 9

CENTRALIZED BRANCH INTELLIGENCE SYSTEM AND METHOD FOR A GEOMETRY ACCELERATOR

FIELD OF THE INVENTION

The present invention generally relates to computer graphics systems and, in particular, to a centralized branch intelligence system and method for enabling efficient multiway logic branching in ROM-based control units of a high performance geometry accelerator.

BACKGROUND OF THE INVENTION

Computer graphics systems are commonly used for displaying graphical representations of objects on a two-dimensional display. Current computer graphics systems provide highly detailed visual representations of objects and are used in a variety of applications.

A typical computer that employs a computer graphics system is shown in FIG. 1. Referring to FIG. 1, the computer 11 includes a central processing unit (CPU) 12, a system memory 14 for storing software that is executed by the CPU 12, a graphics system 16 for processing graphics data received from the CPU 12, a local interface 18 configured to electrically interconnect the foregoing elements, and a display 21 connected to the graphics system 16 via a connection 22 and configured to display the image data generated by the graphics system 16.

The graphics system 16 breaks down objects to be represented on the display 21 into graphics primitives. "Primitives" are basic components of a image data and may include points, lines, vectors, and polygons, such as triangles and quadrilaterals. Typically, hardware and/or software is implemented in the graphics system 16 in order to render, or draw, the graphics primitives that represent a view of one or more objects being represented on the display 21.

Generally, the primitives of an object to be rendered are defined by the CPU 12 in terms of primitive data. For example, when a primitive is a triangle, the CPU 12 may define the primitive in terms of, among other things, x, y, and z coordinates and color values (e.g., red, green, blue) of its vertices. Additional primitive data may be used in specific applications. Rendering hardware in a rasterizer of the graphics system ultimately interpolates the primitive data to compute the final display screen pixel values that represent each primitive, and the R, G, and B color values for each pixel.

The graphics system 16 is shown in further detail in FIG. 2. As shown in FIG. 2, the computer graphics system 16 includes one or more geometry accelerators 23 that are configured to receive vertex data from the CPU 12 and define the primitives that make up the view to be displayed. Each geometry accelerator 23 comprises a number of specialty control units 17 for processing the image data, including for example, a transform mechanism (TRANS) 24 for performing transformations on the vertex data, such as scaling or moving a vertex in space, a clip mechanism (CLIP) 26 for clipping portions of objects that extend beyond a boundary, a light mechanism (LIGHT) 28 for enhancing the image data by simulating light conditions, and a plane equation mechanism (PLANE) 32 for defining the primitives in terms of mathematical floating point plane equations. Each of the control units 17 is typically implemented via cell logic and as separate distinct state machines. The output of the geometry accelerator 23, referred to as rendering data, is used to generate final screen coordinate and color data for each pixel and each primitive. The output 33 is passed to a floating point to fixed point (FP-TO-FIXED) transformation unit 34, which converts the geometry accelerator output 33 to fixed point format 35 and which passes the value to a rasterizer 36. The rasterizer 36 produces pixel data 37, which is communicated to a frame buffer controller 38 and then to a frame buffer 42. The frame buffer 42 serves to temporarily store the pixel data prior to communication to the display. The pixel data is passed from the frame buffer 42 through a digital-to-analog converter (DAC) 44 and then to the display 21.

The operations of the geometry accelerator 23 are highly mathematical and computation intensive. One frame of a three-dimensionally dimensional (3D) graphics display may include on the order of hundreds of thousands of primitives. To achieve state-of-the-art performance, the geometry accelerator 23 may be required to perform several hundred million floating point calculations per second. Furthermore, the volume of data transfer between the CPU 12 and the graphics system 16 is very large. The data for a single quadrilateral may be on the order of sixty-four words of thirty-two bits each. Additional data transmitted from the CPU 12 to the geometry accelerator 23 includes light parameters, clipping parameters, and other parameters needed to generate the graphics image for the display 21.

It is common in geometry accelerators 23 to have a stack of processing elements 52, as illustrated in FIG. 3, including but not limited to, an arithmetic logic unit (ALU) 54, a multiplier 55, a divider 56, a comparison mechanism 57, a clamping mechanism 58, etc., along with register and random access memory (RAM) work spaces 61, 62. The processor elements are typically shared by the plurality of specialty control units 17. Each control unit 17 is capable of directing the processing activities of individual processor elements 52 to accomplish specific computational tasks.

To provide processor element access to each control unit 17, adequate control line connectivity and access control should be established between the processor elements 52 and each control unit 17. One solution to providing control line connectivity is illustrated in FIG. 3 and involves multiplexing the control lines between each control unit and each processor element 52. A multiplexer (MUX) 66 of FIG. 3 serves this purpose. The MUX 66 is controlled by a MUX control mechanism 68. The MUX control mechanism 68 provides an enable signal 69 to the MUX 66 in order to control which one of the control units 17 is allowed to access the processor elements 62 at a given time. In operation, the MUX control 68 asserts an enable signal 69 pertaining to a particular control unit 17 to the MUX 66 and a go signal 72 to the particular control unit 17. In turn, the particular selected control unit 17 generates operands and a processor start signal to begin a processing operation, which are ultimately forwarded to the stack 51. The control unit 17 accesses the stack 51 and the specific desired processing element 52 via an appropriate connection 74, MUX 66, and connection 76. The control unit 17 causes the operating processing element 52 to retrieve data from the input buffer 77 (usually, a FIFO buffer) and store a result(s) in an output buffer 82 (usually, FIFO buffer). The control unit 17 can initiate any number of operations via one or more of the processing elements 52. When the control unit 17 is done with its turn, then it asserts a done signal 84 to the MUX control 68. The MUX control 68 then asserts another go signal 72 to another control unit 17, while providing an enable signal 69 corresponding to the next control unit 17.

A problem with the foregoing design is the large number of gate levels that are required to implement the MUX 66. Another problem is that the MUX 66 increases the time needed for signals to be communicated from the control unit 17 to the processing elements 52. Gate delay alone is part of this increase. Loading also contributes to the time delay, even if a tri-state MUX 66 is employed to replace the multi-layered gate arrangement. Furthermore, the aforementioned problems are magnified as the number of control units 17 and the number of processing elements 52 are increased.

A heretofore unaddressed need exists in the industry for a system and method for better interfacing control units 17 with processing elements 52 in order to optimize the performance of a geometry accelerator in a computer graphics system.

SUMMARY OF THE INVENTION

The present invention provides for a centralized branch intelligence system and method for enabling efficient multiway logic branching in ROM-based control units of a high performance geometry accelerator of a computer graphics system. In general, the centralized branch intelligence system and method minimize space requirements and increase speed in the geometry accelerator.

In architecture, the system is implemented as follows. The geometry accelerator includes a plurality of processing elements (e.g., an arithmetic logic unit, a multiplier, a divider, a compare mechanism, a clamp mechanism, etc.) and a plurality of control units (e.g., a transform mechanism, a decomposition mechanism, a clip mechanism, a bow-tie mechanism, a light mechanism, a classify mechanism, a plane equation mechanism, a fog mechanism, etc.) that utilize the processing elements for performing data manipulations upon image data. In accordance with the invention, the control units are implemented in a read-only memory (ROM) via microcode instructions.

Branch logic is associated with the ROM for assisting control units in multiway branching. The branch logic is organized in a simple hierarchy in order to help streamline and optimize the requisite logic. It comprises two levels of logic: (1) distributed control unit logic having a plurality of control unit logic elements corresponding respectively with each control unit, each element for tracking states of its respective control unit, and (2) branch central intelligence mechanism for tracking higher level system states, including but not limited to, rendering and light modes, primitive type, etc. In essence, the former controls instruction branching within each corresponding control unit and the latter controls branching among the various control units, i.e., controls branching from one control unit to another.

A next address field is associated with each of the microcode instructions in the ROM and defines a location in the ROM of a next instruction to be executed. Each of the control unit logic elements is configured to evaluate and define a next address field for a currently executing instruction associated with a corresponding ROM-based control unit based upon state data received from the stack, the corresponding ROM-based control unit, and the branch central intelligence mechanism. More specifically, each next address field is merely partially defined in the ROM from the outset, and the control unit logic elements fully define the next address field dynamically in the ROM during operation by setting one or more bits (preferably, LSBs) associated with the next address field.

The invention can also be conceptualized as providing a method for minimizing space requirements and increasing speed in a geometry accelerator for a computer graphics system by providing centralized intelligence. In this regard, the method can be broadly summarized as follows: implementing a plurality of control units in a read-only memory (ROM) via microcode; implementing a stack of a plurality of processing elements; executing the microcode with said processing elements in order to modify image data; after execution of each microcode instruction, enabling branching to one of a plurality of possible microcode locations based upon a next address associated with the each microcode instruction; tracking operation of said control units with a branch central intelligence mechanism; implementing a plurality of branch logic mechanisms corresponding respectively with the control units; and with each said branch logic mechanism, defining the next address for corresponding instructions based upon state data received from said stack, the branch central intelligence mechanism, and a corresponding ROM-based control unit.

The invention has numerous advantages, a few of which are delineated hereafter, as merely examples.

An advantage of the invention is that it results in a geometry accelerator with higher speed and performance.

Another advantage of the invention is that it enables two-way to eight-way conditional branching within the control units of the geometry accelerator, thereby eliminating requisite multiplexing and control logic.

Another advantage of the invention is that it reduces space required for implementing the control units of a geometry accelerator.

Another advantage of the invention is that it permits communication of very wide instruction words, 211 bits in the preferred embodiment, to be communicated from a control unit to a processing element within a geometry accelerator.

Another advantage of the invention is that it supports thousands of control unit states using the same data path.

Other features and advantages of the invention will become apparent to one with skill in the art upon examination of the following drawings and detailed description. It is intended that all such additional features and advantages be included herein with the scope of the present invention, as is defined by the claims.

BRIEF DESCRIPTION OF THE DRAWINGS

The invention can be better understood with reference to the following drawings. The drawings are not necessarily to scale, emphasis instead being placed upon clearly illustrating principals of the present invention. Furthermore, like reference numerals designate corresponding parts throughout the several views.

FIG. 9 is a schematic diagram showing a simplified implementation example of possible microcode that can be disposed within the ROM of FIGS. 4 and 5.

DETAILED DESCRIPTION OF THE PREFERRED EMBODIMENT

Figure 4:
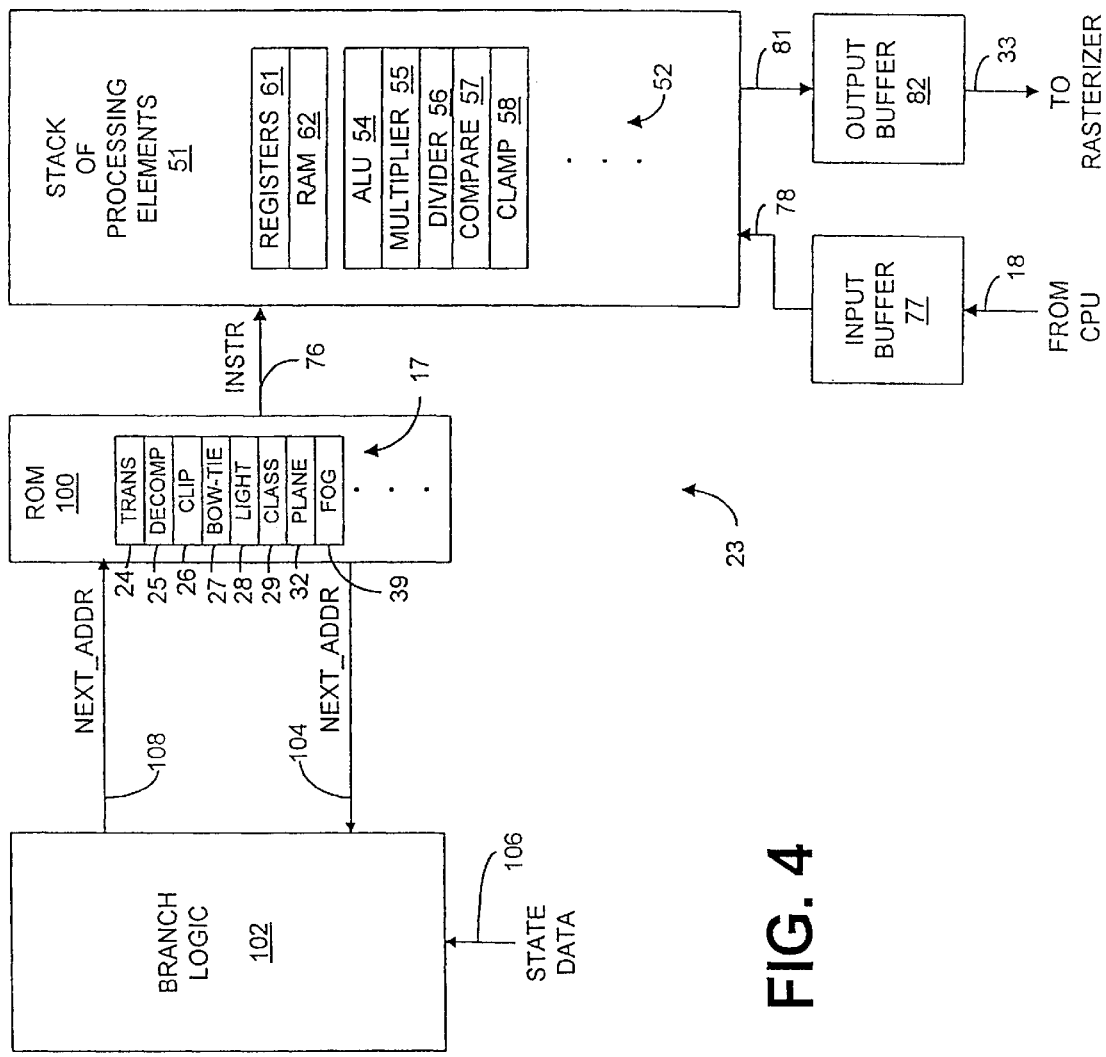
FIG. 4 is an electronic block diagram showing a geometry accelerator of the invention having control units implemented in a read-only memory (ROM) and branch logic configured to assist instruction branching within the ROM.

Generally, referring to FIG. 4, the present invention provides for implementation of control units 17 of a geometry accelerator (FIG. 2) of a computer graphics system 16 (FIGS. 1, 2) within a read-only memory (ROM) 100. Implementation of the control units 17 within the ROM 100 better interfaces the control units 17 with processing elements 52, minimizes space requirements, and increases the overall speed of the geometry accelerator 23. Furthermore, the implementation enables multiway logic branching, which further enhances performance. In other words, multiple decisions can be made at the same time and in parallel.

In architecture, with reference to FIG. 4, the geometry accelerator 23 of the invention includes a number of specialty control units 17 for processing the image data, including for example but not limited to, a transform mechanism (TRANS) 24 for performing transformations on the vertex data, such as scaling or moving a vertex in space, a decomposition mechanism (DECOMP) 25 for decomposing primitives, such as converting a quadrilateral into a triangle, a clip mechanism (CLIP) 26 for clipping portions of objects that extend beyond a boundary, a bow-tie mechanism (BOW-TIE) 27 for processing a bow-tie configuration in order to determine its intersection point and to decompose the primitive into triangles, a light mechanism (LIGHT) 28 for shading and enhancing the image data by simulating one or more light conditions, a classify mechanism (CLASS) 29 for classifying a primitive as front facing or back facing for special effects, a plane equation mechanism (PLANE) 32 for defining the primitives in terms of mathematical floating point plane equations, and a fog mechanism (FOG) 39 for, in essence, imposing a background color upon an object in an image to enhance distance perspective.

Figure 1:
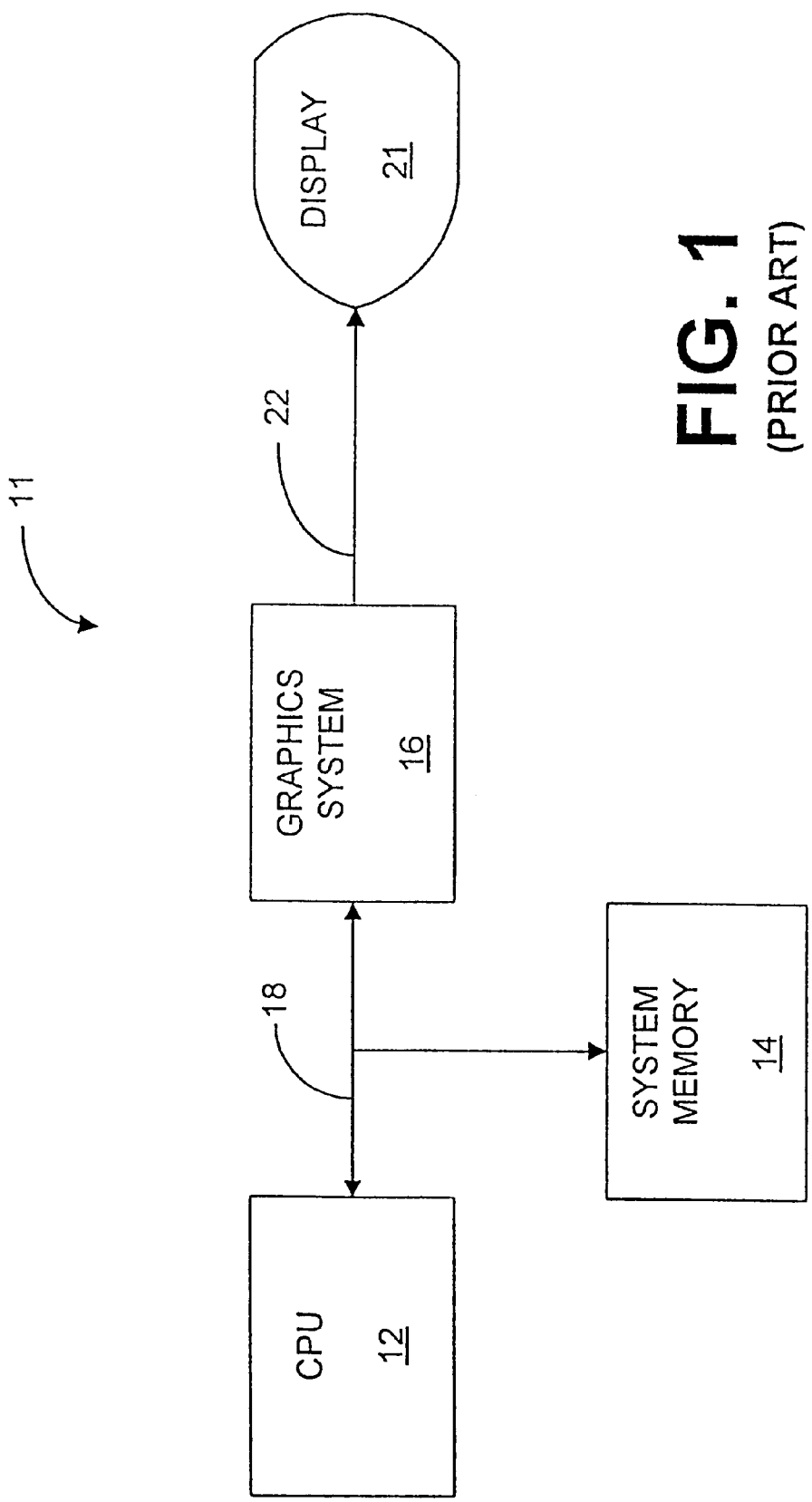
FIG. 1 is an electronic block diagram showing a computer having a graphics system.
Figure 2:
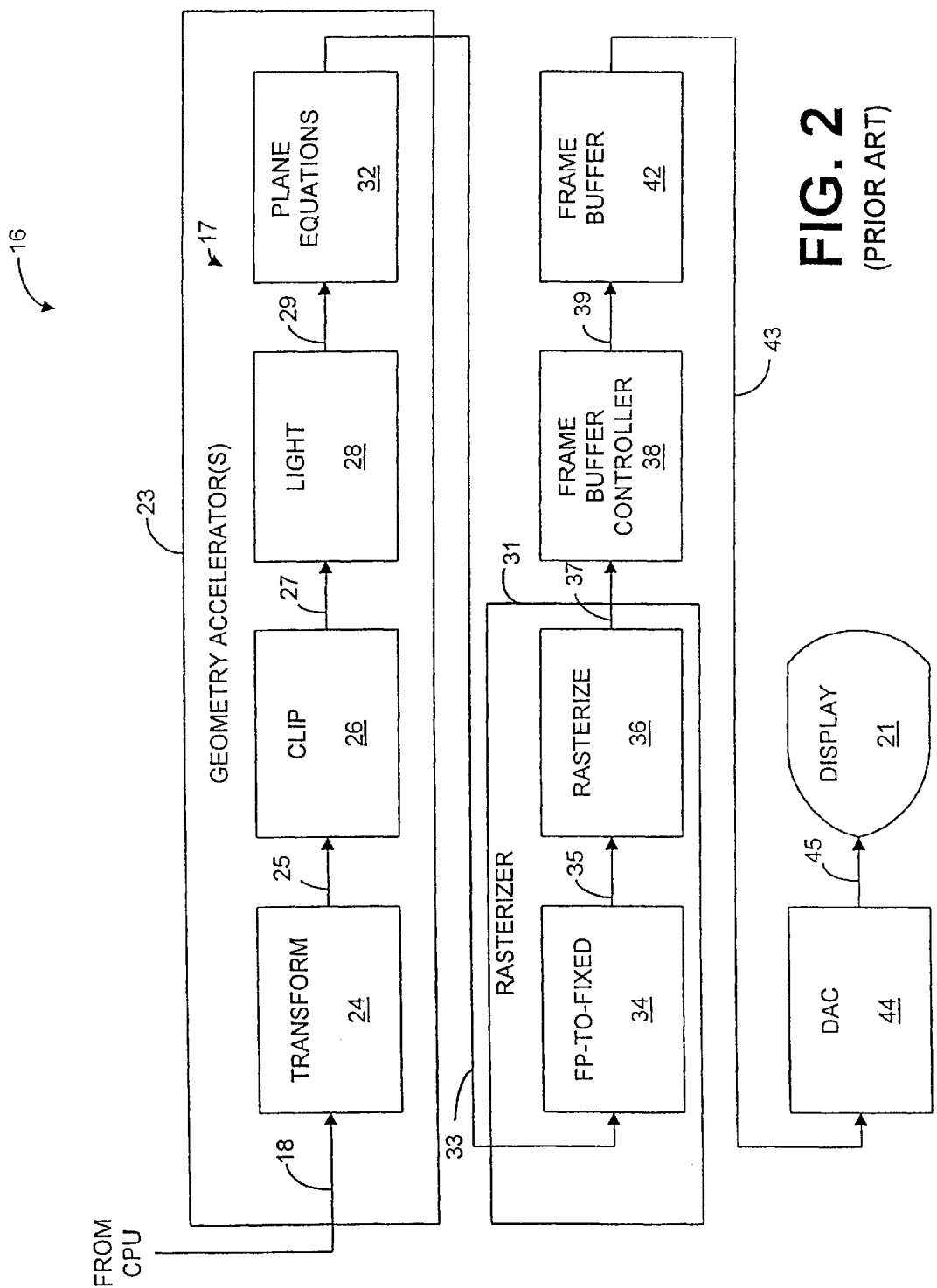
FIG. 2 is an electronic block diagram showing the graphic system of FIG. 1.
Figure 3:
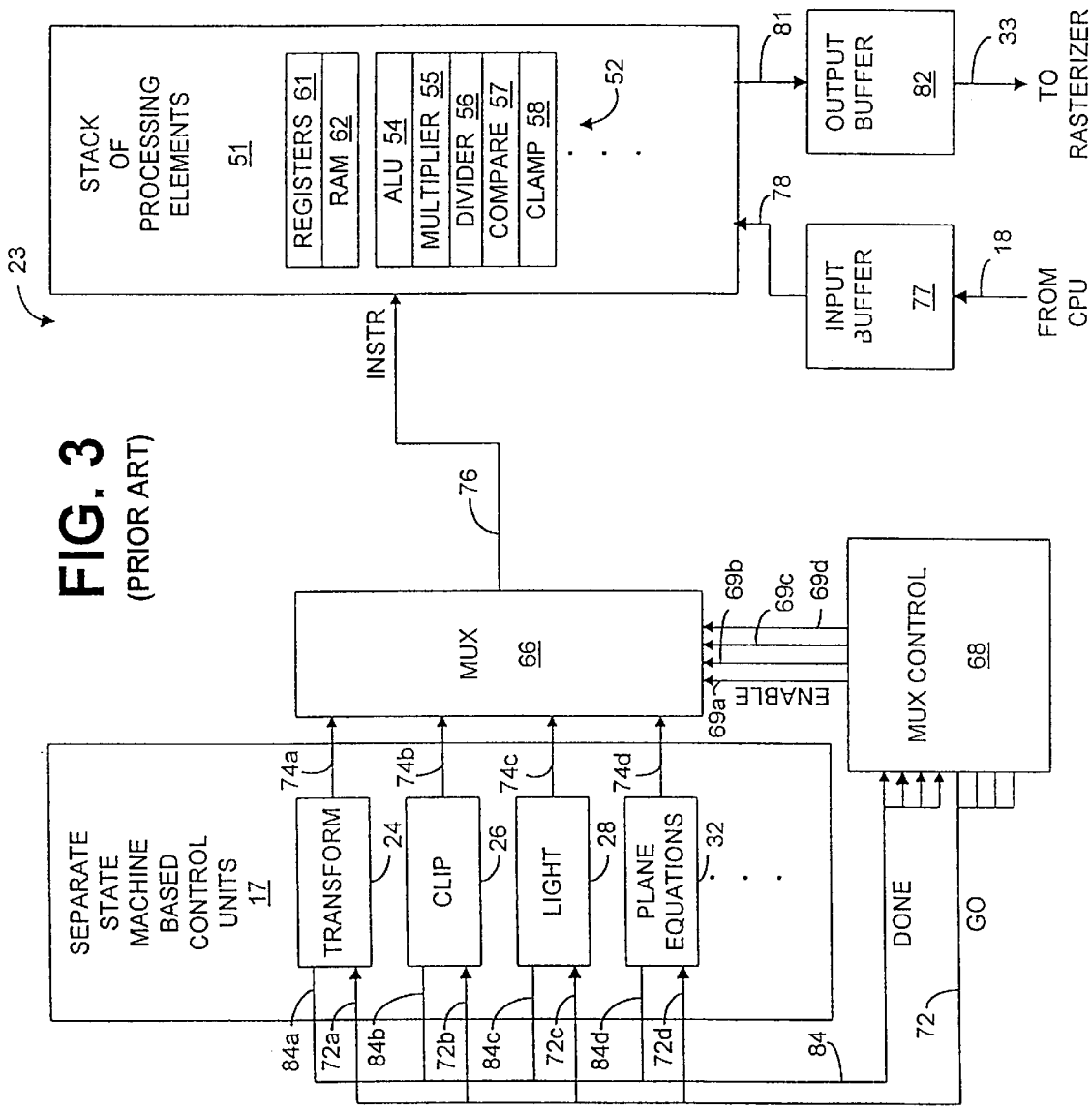
FIG. 3 is an electronic block diagram showing a prior art embodiment of the geometry accelerator of FIG. 2.

Significantly, the geometry accelerator 23 further includes branch logic 102 configured to manipulate, if appropriate, a next address within an instruction currently being executed by the ROM 100 so that the current instruction can ultimately branch to one of up to eight possible instruction locations (only four, in the preferred embodiment), a stack 51 of processing elements 52 as previously described and configured to execute instructions from the ROM 100, an input buffer 77 configured to receive data from the CPU 12 (FIG. 1), and an output buffer 82 configured to provide output data to the rasterizer 31 (FIG. 2). The branch logic 102 is configured to receive an address 104 from the ROM 100 as well as state data 106 from the ROM 100, the stack 51, the CPU 12 (FIG. 1), and/or elsewhere. The state data can include many types of information regarding the state of the geometry accelerator 23, for example, but not limited to, information regarding whether or not a control unit 17 has concluded operation, information regarding the type of primitive or polygon, information regarding whether or not the primitive includes light parameters, rendering mode information, light mode information, etc. Based on the state data 106, the branch logic 102 is configured to make a determination as to whether the next address 104 associated with the current instruction should be modified or left unchanged, and if it is to be modified, how to change the next address.

As shown in FIG. 4, the branch logic 102 is configured to receive the next address, or a part thereof, from the ROM 100 and is configured to output a new next address (modified or unmodified) 108 to the ROM 100. The instruction that is currently executed in the ROM 100 includes the next address 104 in a corresponding next address field (e.g., see FIG. 6). The next address 108 will advise the ROM 100 where to go to next for the next instruction after the current instruction has been fully executed.

An example of logic functionality that may be employed within the branch logic 102 is as follows Assume that primitive data is passed through the transform mechanism 24 and that state data 106 from the transformation control unit 24 in ROM 100 indicates that the primitive is off-screen. Further assume that the current instruction had a next address 104 pointing to the clipping control unit 26. In this case, the branch logic 102 may be configured to change the next address 104 so that the next address 108 points to the beginning of the transformation control unit 24 in order to wait for the next primitive to be processed.

As another example, consider the scenario where lighting is turned off and the address of the current instruction points to the light mechanism 28. In this case, the branch logic 102 may modify the next address so that the current instruction points to a different control unit 17, for example, the plane equation mechanism 32.

Figure 5:
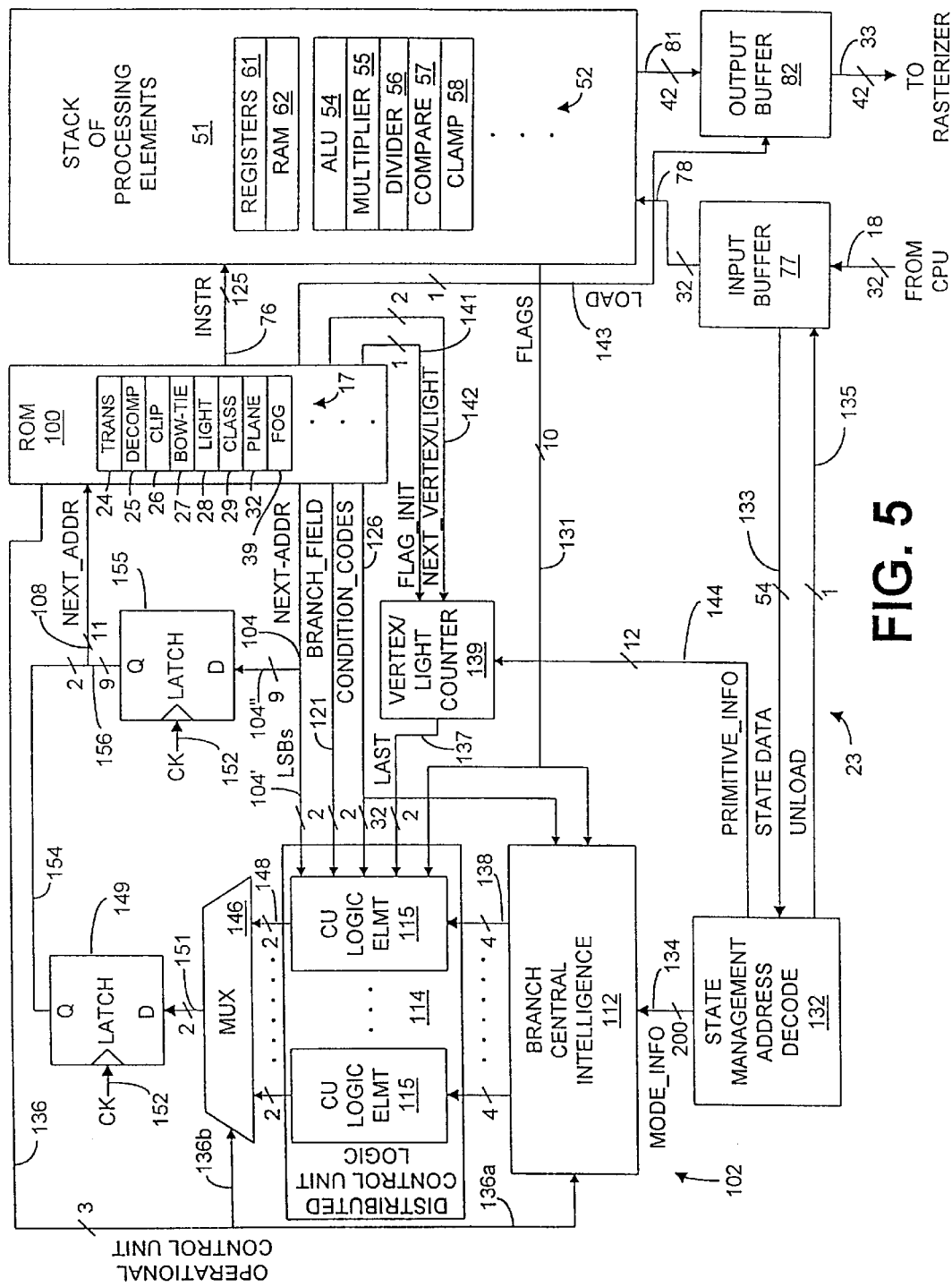
FIG. 5 is an electronic block diagram showing a specific hierarchical logic implementation of the branch logic of FIG. 4 having a branch central intelligence mechanism in accordance with the present invention.

An example of a possible specific implementation of the geometry accelerator 23 is shown in FIG. 5. With reference to FIG. 5, the specific implementation includes branch logic 102 having a hierarchical arrangement of logic functionality. More specifically, the branch logic 102 includes a branch central intelligence mechanism 112 configured to make high level logical decisions and distributed control unit logic 114, which comprises a plurality of individual control unit logic elements (CU LOGIC ELMT) 115 corresponding respectively with each control unit 17. Each control unit logic element 115 is configured to make lower level logical decisions to help each respective control unit 17 accomplish conditional branching and to control indirect addressing.

In the preferred configuration for this specific implementation of FIG. 5, the ROM 100 includes the plurality of control units 17 in the form of generally distinct separate software modules; however, interleaved coding implementations are possible. The code of the modules are executed one at a time, and each drives a particular processing element 52 with instructions 76 (in the preferred embodiment, 211 bits).

Figure 6:
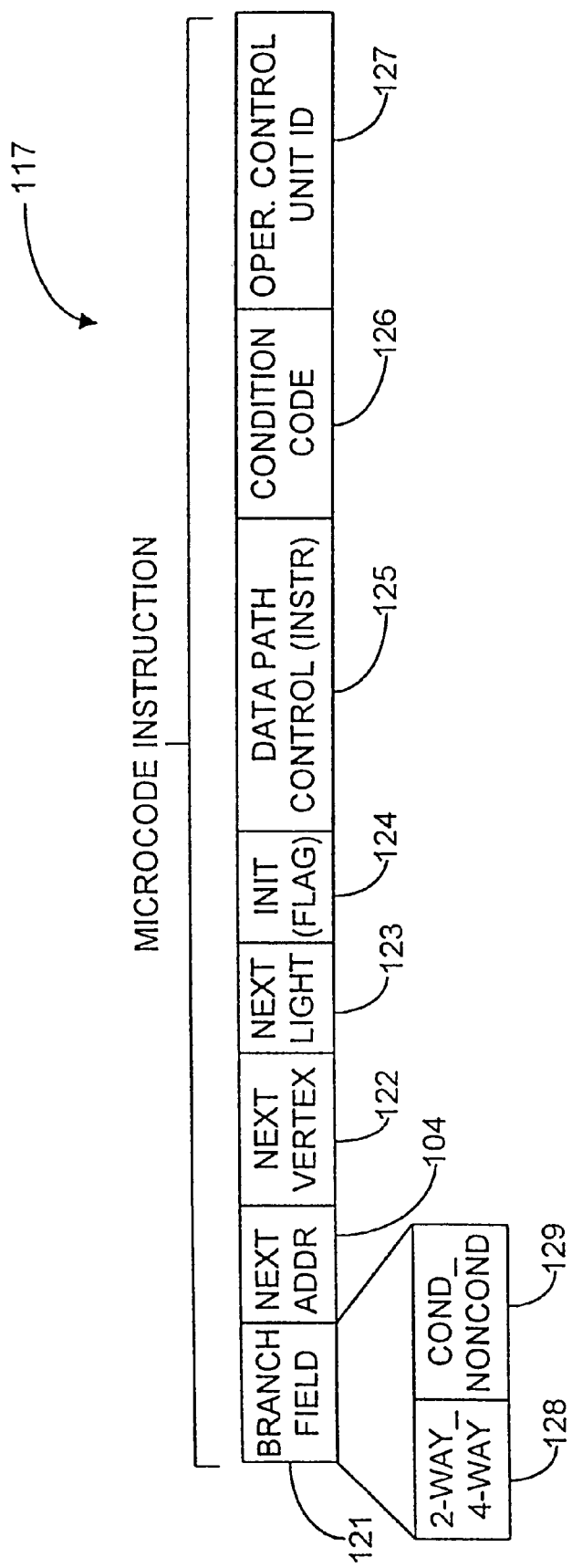
FIG. 6 is a schematic diagram showing an implementation example of fields within a microcode instruction disposed within the ROM of FIG. 4.

Each microcode instruction residing in the ROM 100 has at least the fields set forth in FIG. 6. Referring to FIG. 6, each instruction includes a branch field 121, a next address field 104, a next vertex field 122, a next light field 123, an init (flag) field 124, a data path control (instruction) field 125, a condition code field 126, and an operational control unit identification (ID) field 127. These fields are described hereafter.

The branch field 121 contains help information concerning the number of possible branching locations. Because in the preferred embodiment branching can occur to one of four possible instruction locations, the branch field 121 includes two bits, a 2-way_4-way bit 128 and a cond_uncond bit 129. The former indicates whether the branch is either two-way or four-way and the other defines whether the instruction is conditional or unconditional. "Unconditional" means that indirect branching will not occur after execution of the current instruction and, accordingly, the next address will not be modified by the control unit logic 114. "Conditional" means that indirect branching will occur after execution of the current instruction and, therefore, one or two bits of the next address will be replaced by the control unit logic 114. One bit is replaced, if two way branching, and two bits are replaced, if four way branching.

The next address field 104 identifies the address corresponding with the next instruction to be executed in the ROM 100, which may be in one of a plurality of locations (instruction slots) in accordance with the invention. Each of the control unit logic elements 115 (FIG. 5) is configured to evaluate and define a next address field 104 for a currently executing instruction associated with a corresponding ROM-based control unit 17. Each next address field 104 is merely partially defined in the ROM 100 from the outset, and the control unit logic elements 115 fully define the next address field dynamically during operation by setting one or more bits (in the preferred embodiment, 2 LSBs) associated with the next address field 104.

The next vertex field 122 (preferably, 1 bit) advises the external vertex/light counter 139 (FIG. 5) when to increment its vertex count for the primitive at issue.

The next light field 123 (preferably, 1 bit) advises the external vertex/light counter 139 when to increment its light count for the primitive at issue.

The initialize field 124 identifies whether or not registers 61 and/or RAM work space 62 should be initialized (cleared or preset). Initialization typically occurs when the transform control unit 24 receives a new primitive.

The data path control field 125 is essentially the instruction to be executed by the processing element 52. The data path control field 125 can perform at least the following functions: defines the location of an operand(s) in the registers 61 and/or the RAM 62; defines an operation(s) to be performed upon an operand(s); advises the output buffer 82 when to load data from a processing element 52; and identifies a location(s) where an execution result(s) is to be stored in the registers 61, RAM 62, and/or output buffer 82.

The condition code field 126 identifies a condition code that is essentially state data that identifies the current state of the control unit 17 that is currently in operation within the ROM 100. The condition codes are specific to each control unit 17 in a sense that specific condition code values can mean different things in different control units 17. The condition codes 17 can be utilized in an infinite number of ways to affect logic decisions in the control unit logic elements 115 as well as in the branch central intelligence mechanism 112. For purposes of clarification, some specific examples of condition codes, their meaning, and their interpretation will be described in further detail hereinafter during the discussion of the logic for the control unit logic elements 115 and the branch central intelligence mechanism 112.

The operational control unit identification (ID) field 127 identifies the particular control unit 17 that is currently operating in the ROM 100.

With reference to FIG. 5, the stack 51 includes, as previously mentioned, a plurality of processing elements 52, denoted by reference numerals 54–58, and register and RAM space 61, 62. At any given time, one of the processing elements 52 executes instructions 76 from one of the control units 17 in the ROM 100. During execution, each processing element 52 may receive data from the input buffer 77, and during or after execution, each processing element 52 may place the result(s) in the output buffer 82 under the command of a control unit 17 via load signal 143 preferably (1 bit) for communication to the rasterizer 31 (FIG. 2). The input buffer 77 can provide vertex information to the stack 51. The processing elements 52 are configured to provide flags 131 (10 bits) to the branch logic 102, when appropriate, and depending upon the particular processing element 52. For example, the compare processing element 57 may provide a flag(s) 131 that indicates that two operands are equal, that two operands are not equal, that one operand is greater than another, that one operand is less than another, etc.

A state management address decode mechanism 132 is provided to receive global state data (54 bits, of which 32 bits are data, 21 bits are address, and 1 bit is indicative of whether the input buffer has valid/invalid data), including mode information, from the CPU 12 (FIG. 1) by way of the input buffer 77, as indicated by reference arrow 133. An unload signal 135 (1 bit) from the state management address decode 132 provokes the foregoing transfer of the state data. The mode information controls some behavioral aspects of the geometry accelerator 23. In the preferred embodiment, there are three 32-bit registers controlling the three respective modes of operation: a rendering mode, a first light mode, and a second light mode. Generally, the rendering mode register defines global information concerning the types of graphics effects, or features, that will be accomplished in the image data via suitable processing, for example but not limited to, lighting, fog, texture mapping, etc. Furthermore, the first and second light mode registers define more specific information on how the graphics effects are to be applied to the image data, for example but not limited to, the number and type of lights to be turned on, the type of texture mapping, etc.

The branch central intelligence mechanism 112 of the branch logic 102 receives the mode information 134 (in the preferred embodiment, 200 bits) from the state management address decode mechanism 132. The branch central intelligence mechanism 112 also receives the flags 131 from the stack 51, the condition codes 126 from the ROM 100, and an operational control unit signal 136a (in this example, 3 bits) from the ROM 100 indicative of which control unit 17 is currently operating within the ROM 100. Based upon state data, i.e., the mode information 134, the flags 131, the condition codes 126, and the operational control unit signal 136a, the branch central intelligence mechanism 112 produces and outputs an appropriate next control unit signal 138 to an individual control unit logic element 115 corresponding with the operational control unit 17. The next control unit signal 138 defines which control unit 17 should be branched to next pursuant to the logic within the branch central intelligence mechanism 112.

Each of the individual control unit logic elements 115 situated within the control unit logic 114 assists a corresponding control unit 17 in accomplishing branching and indirect addressing. Each of the individual control unit logic elements 115 is configured to make logical decisions for its respective control unit 17 based upon and as a function of state data, including in the preferred embodiment, two least significant bits (LSBs) 104' of the next address 104 from the current instruction of the ROM 100, the branch field 121 from the current instruction of the ROM 100, a condition code 126 from the current instruction of the ROM 100, last vertex and light signals 137 from a vertex/light counter 139 indicative of whether or not the current instruction involves the last vertex and last light to be processed in a grouping of vertices/lights associated with a code subroutine, and the flags 131 from the stack 51.

The functionality of each control unit logic element 115 may be implemented in cell logic, a look-up table, or any other suitable logic mechanism. As examples of the logic within each individual control unit logic element 115, consider the following. These examples should not be construed as limiting, as there are an infinite number of possible logic configurations.

As a first example, assume that a particular control unit 17 in the ROM 100 is operating. In this example, the condition code may be correlated with the logic in the corresponding control unit logic element 115 so that when the corresponding control unit logic element 115 is forwarded a condition code having a value of i (where i is any number) from the particular control unit 17, then the control unit logic element 115 evaluates the last vertex bit 137 and if the last vertex bit 137 is asserted, then the control unit logic element 115 sets the next address 104 so that the current instruction branches to the light control unit 28.

As another example, assume that the plane equation mechanism 32 is operating, that mathematical operations are being performed upon a plane equation vector, that plane equation parameters dx and dy have already been computed along the vector, and that a compare operation is presently being performed by the compare processing element 57 in the stack 51. In this example, a condition code of value i (any number) from the plane equation mechanism 32 may require the respective control unit logic element 115 to examine a flag 131 from the stack 51 concerning the outcome of the compare operation and define the next address 104 accordingly. Further, if dx is greater than dy based upon the flag 131 (i.e., the code is currently operating upon an x major vector), then the control unit logic element 115 will force the current instruction to branch to a first location in the code. Otherwise, if dy is greater than dx based upon the flag 131 (i.e., the code is currently operating upon an y major vector), then the control unit logic element 115 will force the current instruction to branch to a second location in the code that is different than the first.

As yet another example, assume that a particular control unit 17 is operating and that a condition code having a value of i (any number) indicates to its corresponding control unit logic element 115 to examine the next control unit signal 138 from the branch central intelligence mechanism 112. In this case, when the control unit logic element 115 detects the appropriate condition code of i, then it sets the next address 104 so that branching occurs to another control unit 17 based upon the next control unit signal 138 from the branch central intelligence mechanism 112.

Implementation of a plurality of individual control unit logic elements 115 reduces the size of requisite microcode instructions 76 that must be stored in the ROM 100, and furthermore, reduces the amount of routing logic necessary to implement branching functionality. In other words, the logic of the plurality of individual control unit logic elements 115 could be implemented with a single logic element; however, the single element logic would be much larger in size and logic complexity, and therefore, undesirable, especially for an integrated circuit implementation.

A vertex and light (vertex/light) counter 139 is implemented using any suitable logic. The vertex/light counter 139 is designed to count and track vertices as well as lights for a primitive. It produces a last vertex signal 137 and a last light signal 137 for the individual control unit logic elements 115 to indicate that the last vertex and last light, respectively, of the primitive has been processed based upon and as a function of the following signals: a flag initialize bit 141 from the ROM 100, next vertex/light signals 142 from the ROM 100, and primitive information 144 (12 bits, of which 4 bits indicate primitive type and 8 bits indicate the number of lights that are turned on) from the state management address decode mechanism 132, including the primitive type (e.g., point, vector, triangle, quadrilateral, etc.) and the number of lights, if any, that are turned on.

A MUX 146 receives LSBs 148 (in the preferred embodiment, 2 bits) of the next address 104 from the individual control unit logic elements 115. The operational control unit signal 136b (3 bits, in this example) from the ROM 100 forces the MUX 146 to select the appropriate connection 148 associated with the appropriate control unit logic element 115 corresponding with the operational control unit 17.

A latch 149, preferably a conventional data-type (D-type) flip-flop storage latch, is configured to receive the LSBs 151 from the MUX 146. The latch 149 is clocked by a system clock signal (CK) 152.

A latch 155, preferably a D-type flip-flop storage latch, receives the upper nine bits 104" of the next address 104 from the ROM 100. The latch 155 is clocked by the clock signal (CK) 152. The latch 155 outputs the nine bits 156, which are combined with the two bits 154 from the latch 149, in order to create the next address 108 (11 bits) for the ROM 100.

Figure 7A:
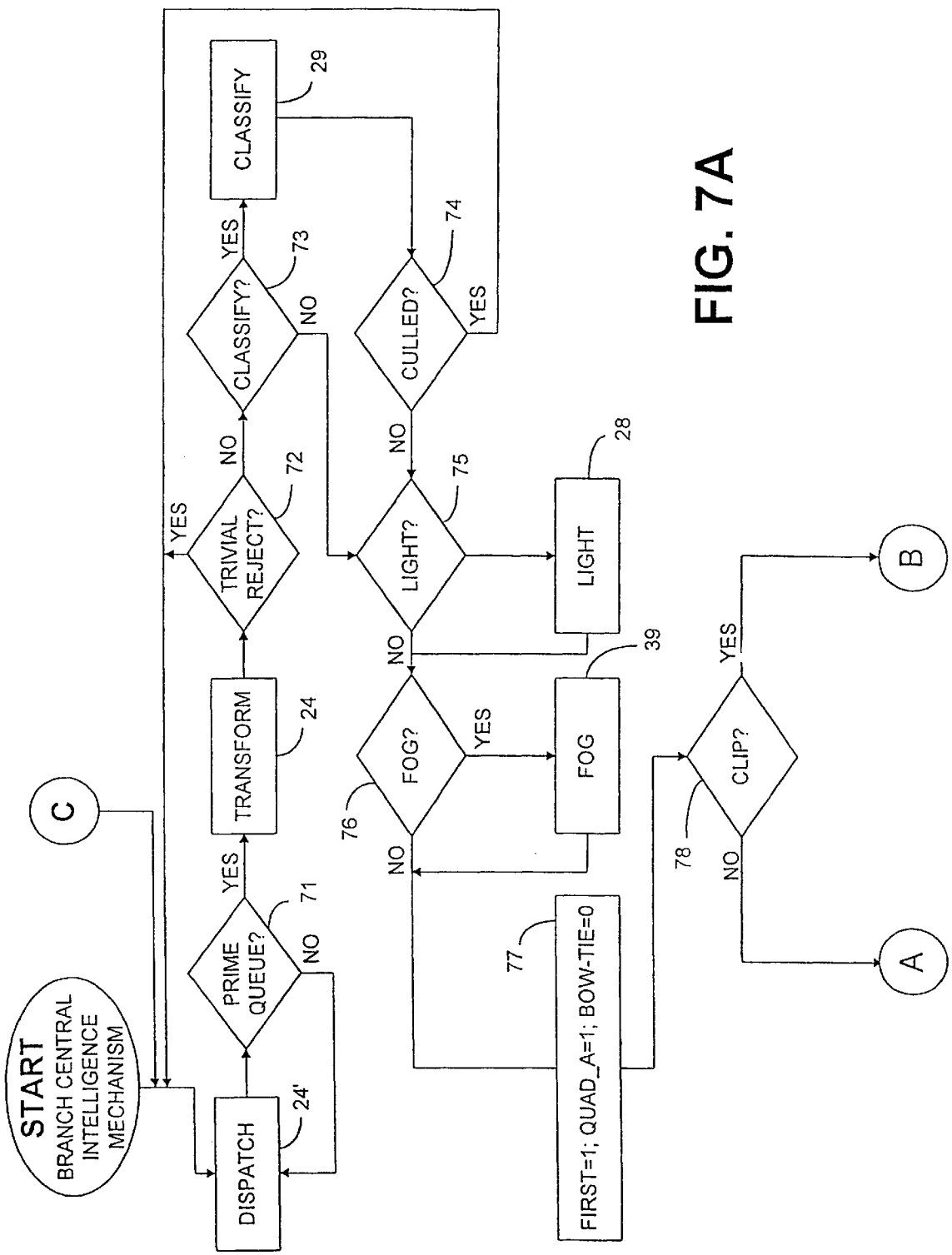
FIGS. 7A–7C are a state diagram showing an implementation example of the branch central intelligence mechanism of FIG. 5.
Figure 7B:
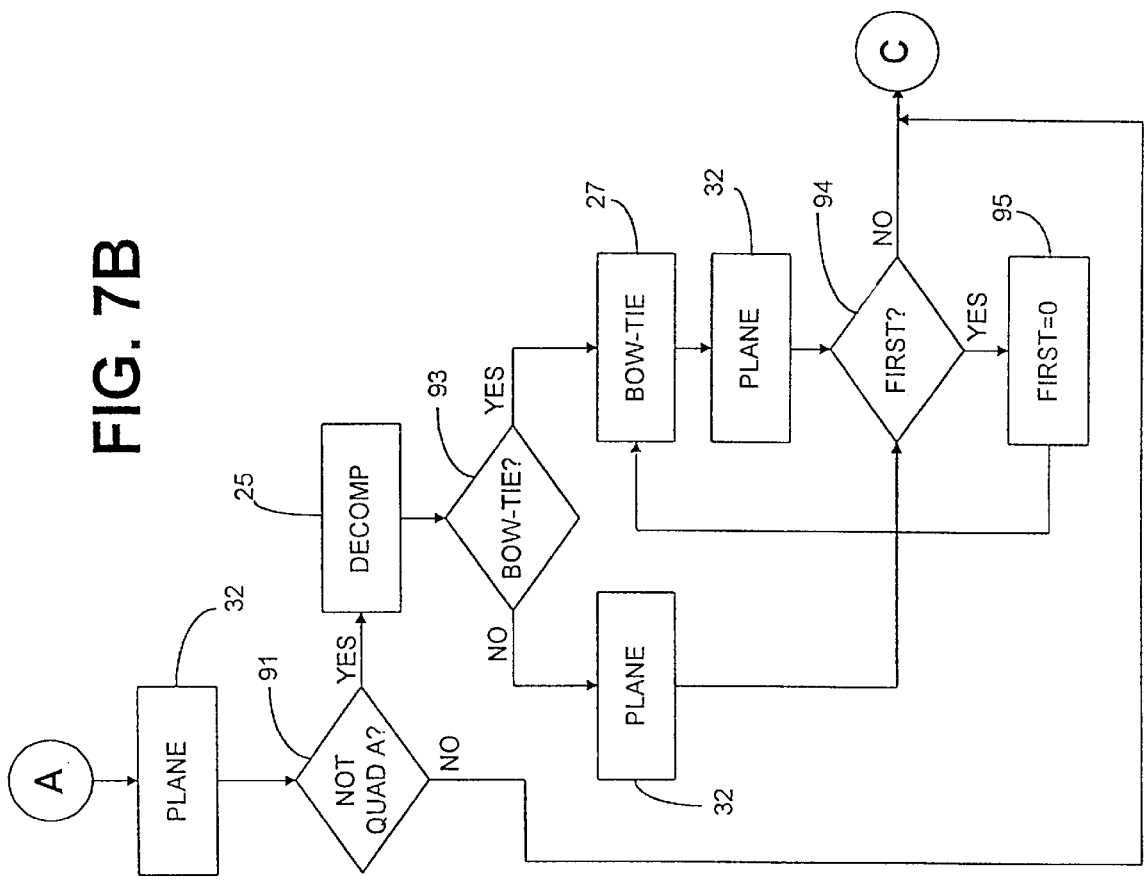
Figure 7C:
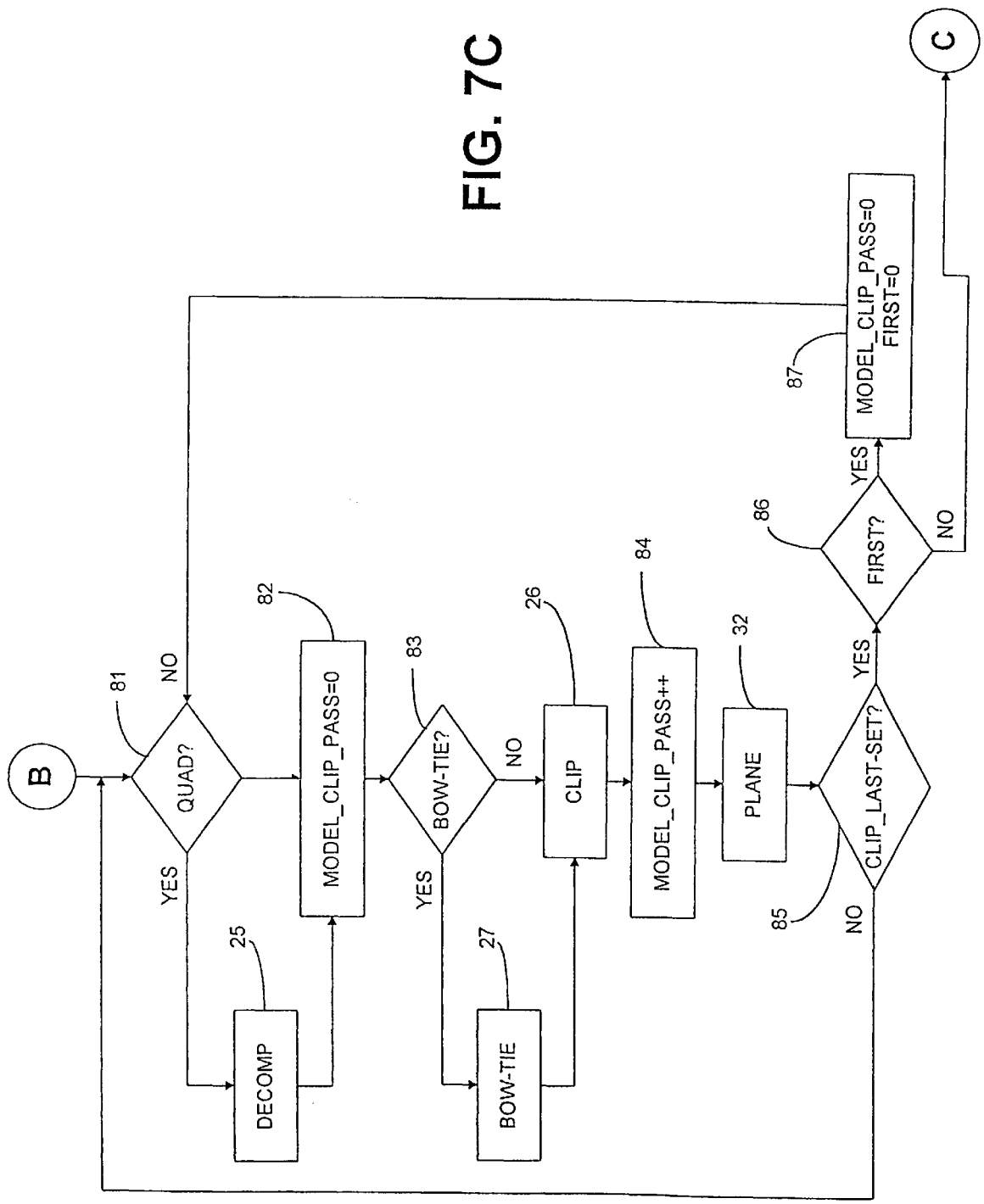

As an example, FIGS. 7A–7C illustrate a state diagram for a possible implementation of the branch central intelligence mechanism 112 (FIG. 5). In FIGS. 7A–7C, the diamond-shaped blocks represent logical decisions made by the branch central intelligence mechanism 112, and the rectangular-shaped blocks represent logic functionality performed by control units 17 within the ROM 100. Hence, FIGS. 7A–7C illustrate how the branch central intelligence mechanism 112 decides which control unit 17 is selected and utilized next for each primitive.

Initially, a dispatch mechanism 24', which is essentially a header in the transform mechanism 24, awaits the arrival of a primitive. Once a primitive arrives, the dispatch mechanism 24' advises the branch central intelligence mechanism 112 of this fact.

The branch central intelligence mechanism 112 continues to monitor the mode information 134 until a primitive arrives. This functionality is indicated at block 71. After a primitive arrives, the branch central intelligence mechanism 112 produces a next control signal unit 138 corresponding with the transform mechanism 24.

After the transform mechanism has transformed the primitive, then a determination is made as to whether the primitive should be trivially rejected, as indicated at block 72. A primitive is trivially rejected if the entire primitive is off the screen, in which case the process will revert back to the dispatch mechanism 24'. If the primitive should not be trivially rejected, than the branch central intelligence mechanism 112 makes a determination as to whether the primitive needs to be classified, as denoted at block 73.

In the preferred embodiment, primitives can be classified as front facing or back facing. Generally, lighting is adjusted based upon these parameters. If the primitive is of the type that needs to be classified, then the branch central intelligence mechanism 112 generates a next control signal 138 that corresponds with the classify mechanism 29. Further, after the classify mechanism 29 classifies the primitive, then the branch central intelligence mechanism 112 determines whether the primitive is culled.

In the preferred embodiment, culling is a feature that has been added to optimize rendering speed. In essence, the user can specify whether front or back facing primitives should be discarded. If the current primitive is a primitive to be discarded, then the process will revert back to the dispatch mechanism 24'. Otherwise, the branch central intelligence mechanism 112 makes a determination as to whether the light mechanism 28 should be called, pursuant to block 75.

If the branch central intelligence mechanism 112 determines at block 73 that the primitive need not be classified, then the branch central intelligence mechanism 112 next makes a determination as to whether the primitive should be lighted with the light mechanism 28, as indicated at block 75.

If at block 75 it is determined that the primitive should be lighted, then the branch central intelligence mechanism 112 defines an appropriate next control unit signal 138 so that the light mechanism 28 is called. If a primitive is not constant color, then it will be lighted.

After lighting, the branch central intelligence mechanism 112 makes a determination as to whether fog should be applied to the primitive, as indicated at block 76. If so, then the fog mechanism 39 is called.

After application of fog or if at block 76 it is determined that not fog will be applied, then the branch central intelligence mechanism 112 initializes internal registers, as indicated in block 77. In this regard, a "first" variable is asserted (set to "1") to indicate that this is the first primitive, a "quad_a" variable is asserted to indicate that this is a type "a" quadrilateral (i.e., a convex quadrilateral), and a variable "bow-tie" is deasserted (set to "0") to indicate that this is not a bow tie.

After setting the internal registers, at block 78, the branch central intelligence mechanism 112 determines whether the primitive needs to be clipped. If so, then process flow continues through blocks 81–86. If not, then process flow continues through blocks 91–95.

In the event that clipping of the primitive is to be performed, then the branch central intelligence mechanism 112 determines whether the primitive is a quadrilateral, as indicated at block 81. If so, then the decomposition mechanism 25 is called. Otherwise, the decomposition mechanism 25 is not called.

After the quadrilateral analysis and decomposition, if necessary, then any specified clipping planes are processed in serial fashion. Each specified clipping plane is processed in a loop as indicated in blocks 83–85 in FIG. 7. Prior to entering the loop, internal registers are initialized. A variable "model_clip_pass" is initialized to 0 so that the first clipping plane is considered and analyzed. With each pass through the loop, a determination is made as to whether there is a bow-tie, as indicated at block 83, in which case the bow-tie mechanism 27 is called in order to compute the intersection point. Further, the clip mechanism 26 and then the plane equation mechanism 32 are employed to further process the data, as illustrated. In the loop, the logic at block 84 increments the model_clip_pass variable, and the logic at block 85 causes the process flow to revert back to block 83, until all clipping planes have been processed.

At block 86, a determination is made as to whether this primitive is the first triangle of the quadrilateral. If not, then process flow reverts back to block 71. If so, then at block 87, the branch central intelligence mechanism 112 sets internal registers in order to process to second triangle of the quadrilateral. In this regard, the variable "model_clip_pass" is set to 0 and the variable "first" is set to 0.

If at block 78, it is determined that the primitive is not to be clipped, then the plane equation mechanism 32 is called, and then the branch central intelligence mechanism 112 verifies whether the primitive is a type "a" (convex) quadrilateral, as indicated at block 91. This is accomplished by observing the flags from the stack 51 and condition codes 126. Specifically, the branch central intelligence mechanism 112 is provided by an appropriate condition code 126 to analyze the flags 131 from the stack 51. The flags 131 indicate the type of quadrilateral. If not, then the process will revert back to block 71 to wait for another primitive. Otherwise, in the case where the primitive is not a type "a" (convex) quadrilateral, then the primitive is decomposed via the decomposition mechanism 25.

Next, the branch central intelligence mechanism 112 makes a determination as to whether the primitive is a bow-tie, as indicated at block 93. If not, then the plane equation mechanism 32 is called. Otherwise, the bow-tie mechanism 27 is called and then the plane equation mechanism 32. The logic of blocks 94–95 insure that both triangles of the bow-tie are processed.

Operation

Figure 8:
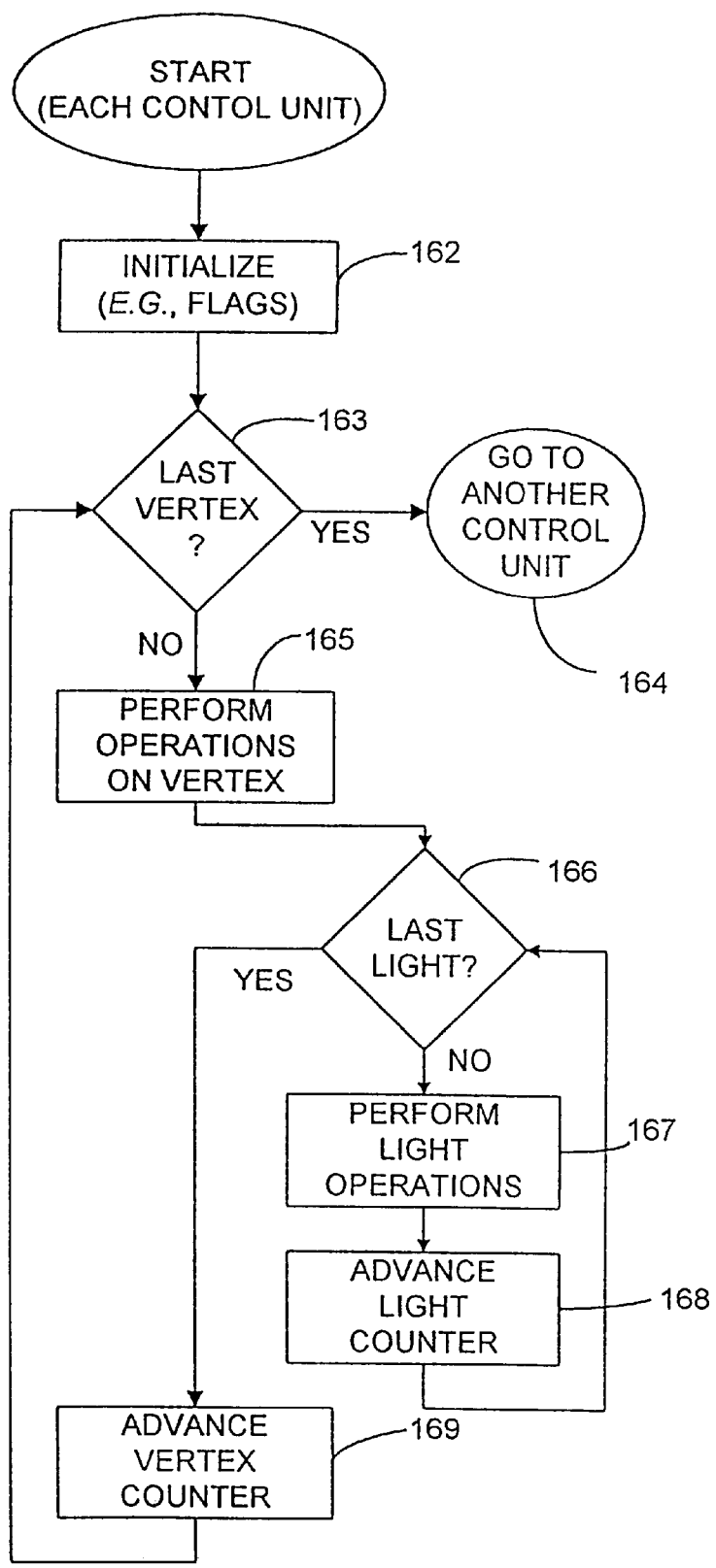
FIG. 8 is a flow chart showing an implementation example of each control unit within the ROM of FIGS. 4 and 5.

The operation of the geometry accelerator 23 having the control units 17 implemented in the ROM 100 will now be described with reference to FIGS. 8 and 9. FIG. 8 shows a flow chart 161 that reflects operation of an example of a control unit 17 within the ROM 100 in conjunction with the branch logic 102. In this example, in general, a control unit 17 processes all vertices and all lights, if any, of a grouping of vertices and lights corresponding with a primitive at issue. Reference will be made to both FIGS. 5 and 8 in the following discussion.

First, primitive data and state data is provided to the input buffer 77 by the CPU 12 (FIG. 1). The state management address decode 132 reads the state data 133 by asserting an unload signal 135 to the input buffer 77. In turn, the state management address decode 132 decodes the state data and provides mode information 134 to the branch central intelligence mechanism 112. Moreover, the branch central intelligence mechanism 112 provides next control unit signals 138 to respective control unit logic elements 115.

A microcode instruction is read by ROM 100, and a microcoded control unit 17 therein is accorded the opportunity to operate within the ROM 100. The microcoded control unit 17 performs an initialization routine at the start of a grouping of vertices/lights, as indicated in flow chart block 162. Here, the control unit 17 of the ROM 100 basically initializes flags, such as flag_init 141, and register and RAM space 61, 62 in the stack 51.

Next, a vertex looping routine is commenced, which processes data associated with a vertex of the primitive during each loop operation. As indicated at block 163, the appropriate control unit logic element 115 determines via the last vertex bit 137 whether the vertex that was recently operated on in the past by the stack 51 is the last vertex of the primitive that is currently at issue.

If so, then the control unit 17 is forced to transfer control of the stack 51 to another control unit 17, as indicated by block 164, by the control unit logic element 115. In this case, the control unit logic element 115 accomplishes this by modifying one or both of the next address LSBs 104'. The high level logic associated with the branch central intelligence mechanism 112 ultimately determines which control unit 17 is utilized next. The control unit logic element 115 determines the appropriate branch location, i.e., how to modify the next address LSBs 104', based upon the next control unit signal 138 from the branch central intelligence mechanism 112.

When the previously processed vertex was not the last and thus more remain to be processed, then the microcode of the control unit 17 performs one or more operations on the present vertex using one or more of the processing elements 52, as indicated at block 165. The corresponding control unit logic element 115 dictates branching during these operations, based upon the branch field 121, the condition codes 126, and flags 131.

For each vertex, a light looping routine is commenced, if applicable, which processes data associated with a light(s) of the primitive during each loop operation. As indicated at block 166, the appropriate control unit logic element 115 determines via the last light bit 137 whether the light that was previously operated on by the stack 51 is the last light of the vertex that is currently at issue.

If not, then light operations are performed, as indicated at block 167. The corresponding control unit logic element 115 dictates branching during these light operations, based upon the branch field 121, the condition codes 126, and flags 131. After the light operations, a light counter is advanced, as denoted at block 168, and process flow reverts back to block 166 to identify another light, if any remains to be processed.

If no more lights remain to be processed at block 166, then the vertex counter 139 (FIG. 5) is advanced via the next__vertex signal 142, as indicated at block 166 in FIG. 8, and another vertex is retrieved for processing, if any remain, as indicated at block 163 in FIG. 8.

The aforementioned process continues in cyclical fashion until all vertices and lights, if any, have been processed in a grouping, in which case one or more other microcoded control units 17 may be given authorization to commence operation until processing on the primitive is complete.

Microcode Example

To further clarify operation, a specific simplified example of microcode in the ROM 100 will now be discussed with reference to FIG. 9. In this example, it is assumed that the ROM 100 contains at least eleven instructions having the contents set forth in FIG. 9.

The ROM 100 will commence the launch of the instruction in slot 0. At commencement of code pertaining to a control unit 17, an initialization routine is performed. Because the initialize flag in the instruction is asserted at this point in view of commencement of a new control unit 17, the ROM 100 would assert the flag__initialize signal 141 (FIG. 5) to the vertex counter 139 (FIG. 5), thereby causing the vertex counter 139 to initialize its vertex count. The vertex counter 139 is advised of the type of primitive and the number of vertices by the state management address decode 132 via primitive information signal 144. Further, the nonconditional flag of this instruction is asserted in the branch field 121, and therefore, the control unit logic elements 115 need not look to the two-way__four-way flag, at all, and need not modify the next address LSBs 104'. Because there is no indirect addressing, the control unit logic elements 115 do not modify the next address field 104. Finally, the instruction evaluates the next__address field, which indicates that the next instruction to be executed is that in instruction slot 1. Accordingly, the next instruction that is executed is that situated in slot 1.

The instruction situated in slot 1 does not require initialization as the initialize flag is deasserted. Therefore, the flag__init signal 141 to the vertex counter 139 is deasserted. The conditional flag of the branch field 121 is asserted, and therefore, the appropriate control unit logic element 115 interprets the two-way__four-way flag, which is set to 0, indicating that the branching is two-way. The next address field of the instruction can be defined by the logic element 115 to branch to the instruction in slot 2 or slot 3, depending upon the condition code 126 and any flag 131 from the stack 51. If the last light or vertex has not been processed in a grouping of vertices/lights based upon the condition code 126, flags 131, and the last signal 137, then the control unit logic element 115 can be configured to cause the ROM 100 to select the instruction situated in slot 2. To do this, the control unit logic element 115 defines the next address LSBs 148 appropriately. In this case, the control unit logic element 115 allows LSB1 of the next address 104 to be passed through unchanged to next address 108 and forces LSB0 of the next address 104 to be deasserted ("0").

The instruction in slot 2 does not require initialization, as indicated by the deasserted initialization flag. The vertex counter 139 (FIG. 5) is not advanced per a deasserted flag__init signal 141. Moreover, the data path control field 125, which is passed to the stack 51 from the ROM 100 on connection 76, causes the ALU 54 (FIG. 5) to execute by adding operands A and B. Operands A and B are retrieved from the registers 61 and/or RAM 62, the location of which is defined in the data path control 125 of the instruction. The result is stored in the register 61, RAM 62, and/or output buffer 82 by the ALU 54. The nonconditional flag is asserted, and therefore, the two-way__four-way flag need not considered, and the control unit logic element 115 need not modify the next address LSBs. Further, the next address is that which is in slot 4, as prescribed by the instruction.

The instruction in slot 4 is launched by the ROM 100 after conclusion of the instruction in slot 2. No initialization occurs, and the vertex counter 139 is not advanced. The instruction causes the ALU 54 to add operands C and D. Operands C and D are retrieved from the registers 61 and/or RAM 62 based upon the data path control 125. The result is stored in the register 61, RAM 62, and/or output buffer 82 by the ALU 54. Further, the instruction is not conditional, and transfers directly to the instruction in slot 5. Again, the control unit logic element 115 does not modify the next address LSBs in this case.

The instruction in slot 5 does not initialize and does not advance the vertex counter 139. It causes the multiplier 55 (FIG. 5) to multiply operands E and F. Operands E and F are retrieved from the registers 61 and/or RAM 62. The result is stored in the register 61, RAM 62, and/or output buffer 82 by the multiplier 55. The instruction is nonconditional, and therefore, the instruction can only branch to one other instruction, that which is situated in slot 6, pursuant to the next__address field. Again, the control unit logic element 115 does not modify the next address LSBs in this case.

The instruction in slot 6 does not perform an initialization process pursuant to the initialize flag. Its data path control field causes the compare mechanism 57 (FIG. 5) to compare the quantities (A+B), (C+D). The instruction is nonconditional. It causes the ROM 100 to look to the instruction in slot 1, after incrementing the vertex counter 139, in accordance with the next__vertex field.

For each primitive, the aforementioned operations will occur once for each vertex, i.e., the ROM 100 will cycle through slots 1, 2, 4, 5, and 6. Thus, in the case of a triangle having three vertices, three cycles through the aforementioned instructions would occur. After the last vertex/light, the branch central intelligence mechanism 112 will recognize a condition code, for example, "7" as shown in FIG. 9, that indicates that the branch logic 115 for this control unit 17 should observe the last signal 137 and determine if it is the last vertex light. In this case, it is. In this event, the branch central intelligence mechanism 112 advises an appropriate control unit logic element 115 of the next control unit 17 to be utilized. The next address field 104 may be set by the appropriate control unit logic element 115 to indicate that the ROM 100 should advance to slot 3 for the next instruction.

At slot 3, the instruction is conditional, as indicated by the asserted conditional flag. Moreover, the four-way flag is asserted, thereby indicating that the next instruction can be in one of four different locations in the ROM 100. These locations are slots 8–11. The control unit logic element 115 makes the decision by defining the next address LSBs, based upon and as a function of the next control unit signal 138 from the branch central intelligence mechanism 112, the condition code 126 from the ROM 100, and any flags 131 from the stack 51. In this example, slots 8–11 correspond to instructions that commence routines for clipping, shading, plane equations, and decomposition. As illustrated in FIG. 9, this instruction indicates a condition code of "5." The condition code "5" might indicate to the control unit logic element 115 that it should examine the next control unit signal 138 from the branch central intelligence mechanism 112 in order to jump to another control unit 17. The next control unit 17 could be for example the light mechanism if the branch central intelligence mechanism 112 determines that shading should occur next, in which case the control unit logic element 115 would define the next address LSBs so that the next address would be defined as slot 9.

In concluding the detailed description, it should be noted that it will be obvious to those skilled in the art that many variations and modifications may be made to the preferred embodiment and specific examples without substantially departing from the principles of the present invention. All such variations and modifications are intended to be included herein within the scope of the present invention, as set forth in the following claims. Further, in the claims hereafter, any "means" element is intended to include any structures, materials, or acts for performing the specified function(s).

Now, therefore, the following is claimed:

1. A method for minimizing space requirements and increasing speed in a geometry accelerator for a computer graphics system by providing centralized branching intelligence, comprising the steps of:
   implementing a plurality of control units in a read-only memory (ROM) via microcode instructions;
   implementing a stack of a plurality of processing elements;
   executing said microcode instructions with said processing elements in order to modify image data;
   after execution of each microcode instruction, enabling branching to one of a plurality of possible microcode locations based upon a next address associated with said each microcode instruction;
   tracking operation of said control units with a branch central intelligence mechanism;
   implementing a plurality of branch logic mechanisms corresponding respectively with said control units; and
   with each said branch logic mechanism, defining said next address for corresponding instructions based upon state data received from said stack, said branch central intelligence mechanism, and a corresponding ROM-based control unit.

2. The method of claim 1, further comprising the steps of:
   associating a condition code field with each of said instructions, said condition code field defining a state of said corresponding control unit; and
   defining said next address field based upon said condition code field.

3. The method of claim 1, further comprising the steps of:
   receiving light parameters concerning a primitive; and
   defining said next address field based upon said light parameters.

4. The method of claim 1, further comprising the steps of:
   receiving rendering parameters concerning a primitive; and
   defining said next address field based upon said rendering parameters.

5. A system for minimizing space requirements and increasing speed in a geometry accelerator for a computer graphics system by providing centralized intelligence, comprising:
   a stack of a plurality of processing elements;
   a plurality of control units implemented in a read-only memory (ROM) via microcode instructions, each of said control units configured to utilize a processing element in order to modify image data;
   a next address field associated with each of said microcode instructions and defining a location in said ROM of a next instruction to be executed;
   a branch central intelligence mechanism configured to control branching between said control units by defining said next address field during execution of said microcode instructions; and
   a plurality of control unit logic elements corresponding respectively with said control units, each of said control unit logic elements configured to evaluate and define said next address field for a currently executing instruction associated with a corresponding control unit based upon state data received from said stack, said corresponding control unit, and said branch central intelligence mechanism.

6. The system of claim 5, wherein a condition code field is associated with each of said instructions, said condition code field defining a state of said corresponding control unit, said each of said control unit logic elements configured to receive said condition code field and define said next address field based upon said condition code field.

7. A system for minimizing space requirements and increasing speed in a geometry accelerator for a computer graphics system by providing centralized intelligence, comprising:
   a stack of a plurality of processing elements;
   a plurality of control units implemented in a read-only memory (ROM) via microcode instructions, each of said control units configured to utilize a processing element in order to modify image data;
   a next address field associated with each of said microcode instructions, said next address field having a value that defines a location in said ROM of a next instruction to be executed; and
   a branch central intelligence mechanism configured to control branching between said control units by defining said value of said next address field during execution of said microcode instructions;
   wherein said next address field has a first portion and a second portion, said first portion being predefined and defining a plurality of locations in said ROM; and
   wherein said branch central intelligence mechanism is configured to select one of said locations in said ROM by defining said second portion of said next address field during execution of said microcode instructions.

8. The system of claim 7, wherein said control units include a transform mechanism, a decomposition mechanism, a clip mechanism, a bow-tie mechanism, a light mechanism, a classify mechanism, a plane equation mechanism, or a fog mechanism.

9. The system of claim 7, wherein said processing elements include an arithmetic logic unit, a multiplier, a divider, a compare mechanism, or a clamp mechanism.

10. The system of claim 7, further comprising a plurality of control unit logic elements corresponding respectively with said control units, each of said control unit logic elements configured to evaluate and define said next address field for a currently executing instruction associated with a corresponding control unit based upon state data received from said stack, said corresponding control unit, and said branch central intelligence mechanism.

11. The system of claim 7, further comprising a plurality of control unit logic elements corresponding respectively with said control units, each of said control unit logic elements configured to control internal instruction branching within each of said respective control units.

12. The system of claim 7, wherein a condition code field is associated with each of said instructions, said condition code field defining a state of said corresponding control unit, said branch central intelligence mechanism configured to receive said condition code field and to select said value of said next address field based upon said condition code field.

13. The system of claim 7, said branch central intelligence mechanism is configured to receive light parameters and to select said value of said next address field based upon said light parameters.

14. The system of claim 7, said branch central intelligence mechanism is configured to receive rendering parameters and to select said value of said next address field based upon said rendering parameters.

15. A method for minimizing space requirements and increasing speed in a geometry accelerator for a computer graphics system by providing centralized branching intelligence, the geometry accelerator including a plurality of processing elements and a plurality of control units, comprising the steps of:

implementing said plurality of said control units in a read-only memory (ROM) via microcode instructions, each of said control units configured to utilize a processing element in order to modify image data;

providing a next address field with each of said microcode instructions, said next address field having a value that defines a location in said ROM of a next instruction to be executed; and controlling branching between said control units by changing a portion of said next address field during execution of said instructions.

16. The method of claim 15, further comprising the steps of:

associating a condition code field with each of said instructions, said condition code field defining a state of said corresponding control unit; and establishing said value of said next address field based upon said condition code field.

17. The method of claim 15, further comprising the steps of:

receiving light parameters concerning a primitive; and establishing said value of said next address field based upon said light parameters.

18. The method of claim 15, further comprising the steps of:

receiving rendering parameters concerning a primitive; and establishing said value of said next address field based upon said rendering parameters.

* * * * *